US010740238B2

(12) United States Patent
Gerhard et al.

(10) Patent No.: US 10,740,238 B2
(45) Date of Patent: Aug. 11, 2020

(54) DYNAMICALLY DETERMINING CACHE DESTAGE RATES FOR MULTIPLE STORAGE ARRAYS (71) Applicant: International Business Machines Corporation, Armonk, NY (US)

(72) Inventors: Adrian Gerhard, Rochester, MN (US); Joseph P. Bush, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/188,199

(22) Filed: Nov. 12, 2018

(65) Prior Publication Data
US 2020/0151099 A1 May 14, 2020

(51) Int. Cl.
*G06F 12/0842* (2016.01)
(52) U.S. Cl.
CPC .. *G06F 12/0842* (2013.01); *G06F 2212/1044* (2013.01)
(58) Field of Classification Search
CPC ........... G06F 12/12; G06F 12/00; G06F 13/00
USPC ........................................................ 711/103
See application file for complete search history.

(56) References Cited

U.S. PATENT DOCUMENTS

| 5,696,932 A | 12/1997 | Smith |
| 9,256,533 B2 * | 2/2016 | Benhase ............. G06F 12/0802 |
| 2011/0191534 A1 | 8/2011 | Ash et al. |
| 2012/0124294 A1 | 5/2012 | Atkisson et al. |
| 2012/0198174 A1 | 8/2012 | Nellans et al. |
| 2012/0221774 A1 | 8/2012 | Atkisson et al. |
| 2015/0058561 A1 * | 2/2015 | Ash ....................... G06F 3/0641 711/114 |

FOREIGN PATENT DOCUMENTS

WO      WO-2008141900 A1 * 11/2008 ........... G06F 3/0655

OTHER PUBLICATIONS

Whyte, Barry, "IBM SAN Volume Controller 4.2.1 Cache Partitioning", 2008, IBM—http://www.redbooks.ibm.com/redpapers/pdfs/redp4426.pdf (Year: 2008).*
Varma et al., Destage Algorithms for Disk Arrays with Non-Volatile Caches, 22nd Annual International Symposium on Computer Architecture (ISCA), pp. 83-95, Jun. 1995.

* cited by examiner

*Primary Examiner* — Tuan V Thai
(74) *Attorney, Agent, or Firm* — Martin & Associates, LLC; Derek P. Martin (57) ABSTRACT A storage controller includes a cache destage controller that determines write cache destage rates for each of a plurality of storage arrays as a function of available system resources. When the available system resources are sufficient to satisfy the optimal destage rates for all arrays, the destage rate for each array is set to its optimal rate. When the available system resources are insufficient to satisfy the array rates of all of the arrays, each array is allocated destage rate that is a percentage of the array rates based on the available resources. When the available system resources are insufficient to satisfy the optimal destage rates for all arrays, but sufficient to satisfy the array rates of some of the arrays, a destage rate is determined for each array based on mathematical relationships between sums of the array rates, global rates, optimal rates, and sums of these across arrays.

6 Claims, 8 Drawing Sheets

DYNAMICALLY DETERMINING CACHE DESTAGE RATES FOR MULTIPLE STORAGE ARRAYS

BACKGROUND

1. Technical Field

This disclosure generally relates to storage arrays in computer systems, and more specifically relates to allocating cache destage resources for a write cache for multiple storage arrays.

2. Background Art

Storage subsystems for multiple storage arrays, such as multiple arrays of disk drives, have been developed. A Redundant Array of Independent Disks (RAID) is one specific example of a known type of storage subsystem that includes multiple storage arrays. A storage subsystem for multiple storage arrays typically includes a write cache. Data for all arrays in a storage subsystem is written to the write cache. A cache destage controller determines when data is destaged from the cache to the arrays. Destaging is the process of writing data from the write cache to the arrays. Destaging is an important process in the storage controller because destaging at too high a rate consumes more system resources, increases the utilization of the media, and results in the write cache being mostly empty most of the time. Destaging at too low a rate results in the write cache filling up and being unable to take more write data. The destage rate for the write cache can thus significantly impact performance of the storage subsystem.

One known way to set destage rates for a write cache is to provide a minimal rate when the write cache is less than some specified percentage full, such as 20%, to provide a maximum rate when the write cache is greater than some specified percentage full, such as 80%, and providing a linear function between the minimum and maximum rates between the two thresholds. Setting the destage rate for the write cache in this manner does not take into account the specific characteristics of the individual arrays serviced by the write cache, and can thus use excess resources for arrays that don't need those resources, when another array would benefit from using those resources instead.

BRIEF SUMMARY

A storage controller includes a cache destage controller that determines write cache destage rates for each of a plurality of storage arrays as a function of available system resources. When the available system resources are sufficient to satisfy the optimal destage rates for all arrays, the destage rate for each array is set to its optimal rate. When the available system resources are insufficient to satisfy the array rates of all of the arrays, each array is allocated destage rate that is a percentage of the array rates based on the available resources. When the available system resources are insufficient to satisfy the optimal destage rates for all arrays, but sufficient to satisfy the array rates of some of the arrays, a destage rate is determined for each array based on mathematical relationships between sums of the array rates, global rates, optimal rates, and sums of these across arrays. If an array has very little data in cache, the array is said to be below a minimum data threshold. The minimum data threshold is used to otherwise reduce an increase in a destage rate to an array that does not meet the minimum data threshold, thereby reducing the system resources used by that array and making these system resources available to other arrays.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein are directed to a storage controller that includes a cache destage controller that determines write cache destage rates for each of a plurality of storage arrays as a function of available system resources. When the available system resources are sufficient to satisfy the optimal destage rates for all arrays, the destage rate for each array is set to its optimal rate. When the available system resources are insufficient to satisfy the array rates of all of the arrays, each array is allocated destage rate that is a percentage of the array rates based on the available resources. When the available system resources are insufficient to satisfy the optimal destage rates for all arrays, but sufficient to satisfy the array rates of some of the arrays, a destage rate is determined for each array based on mathematical relationships between sums of the array rates, global rates, optimal rates, and sums of these across arrays. If an array has very little data in cache, the array is said to be below a minimum data threshold. The minimum data threshold is used to otherwise reduce an increase in a destage rate to an array that does not meet the minimum data threshold, thereby reducing the system resources used by that array and making these system resources available to other arrays.

Figure 1:
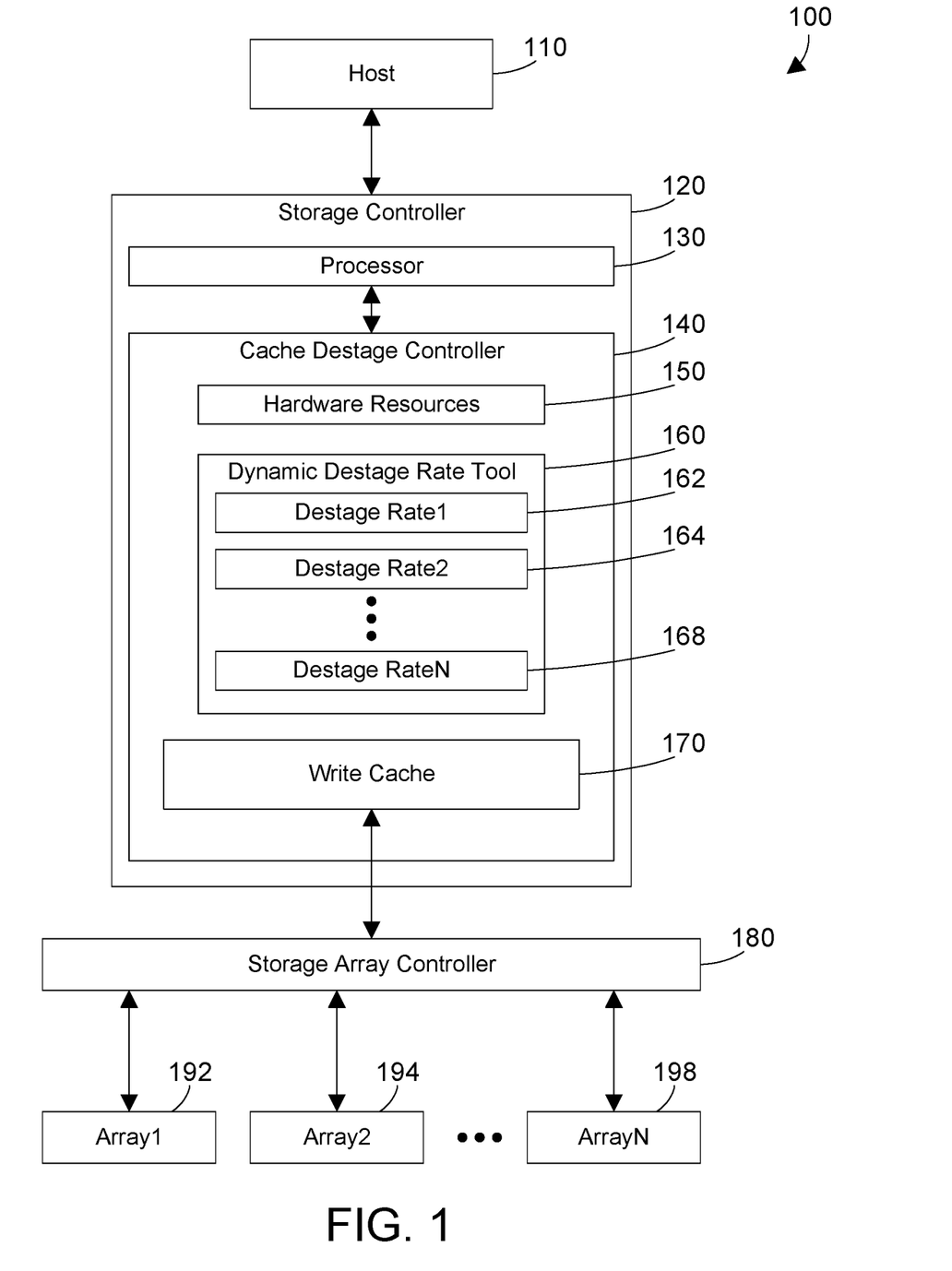
FIG. 1 is a block diagram of a system that includes a host computer system that accesses a storage controller that stores data to and reads data from multiple arrays of storage devices.

Referring to FIG. 1, a system 100 includes a host computer system 110 that accesses a storage controller 120 that manages storage accesses to multiple storage arrays, shown in FIG. 1 as Array1 192, Array2 194, ... ArrayN 198. The storage controller 120 includes a processor 130 and a cache destage controller 140. Processor 130 may be constructed from one or more microprocessors and/or integrated circuits. Processor 130 executes program instructions stored in main memory and interacts with the host 110. Cache destage controller 140 includes hardware resources 150, a dynamic destage rate tool 160, and a write cache 170. The dynamic destage rate tool 160 preferably includes a number of dynamic destage rates that have a one-to-one correspondence with the number of arrays being serviced by the cache destage controller 140. Thus, when there are five arrays, the dynamic destage rate tool 160 will have five destage rates, where each destage rate corresponds to one of the five arrays. The destage rates in FIG. 1 are shown as destage rate1 162, destage rate2 164, . . . destage rateN 168, which correspond to the arrays 192, 194, . . . , 198. The write cache 170 is written to by the storage controller 120 when data is written by the host 110 to one of the arrays 192. The write cache 170 preferably writes to a storage array controller 180, which reads data from and writes data to each array. The destaging of data from the write cache 170 can be to the storage array controller 180. In the alternative, the storage array controller 180 could be omitted, which means the destaging of data from the write cache 170 will be directly to the arrays 192, 194, . . . , 198. The storage controller 120 may include many other features that are known in the art, but are not shown in FIG. 1 for the sake of simplicity.

Figure 2:
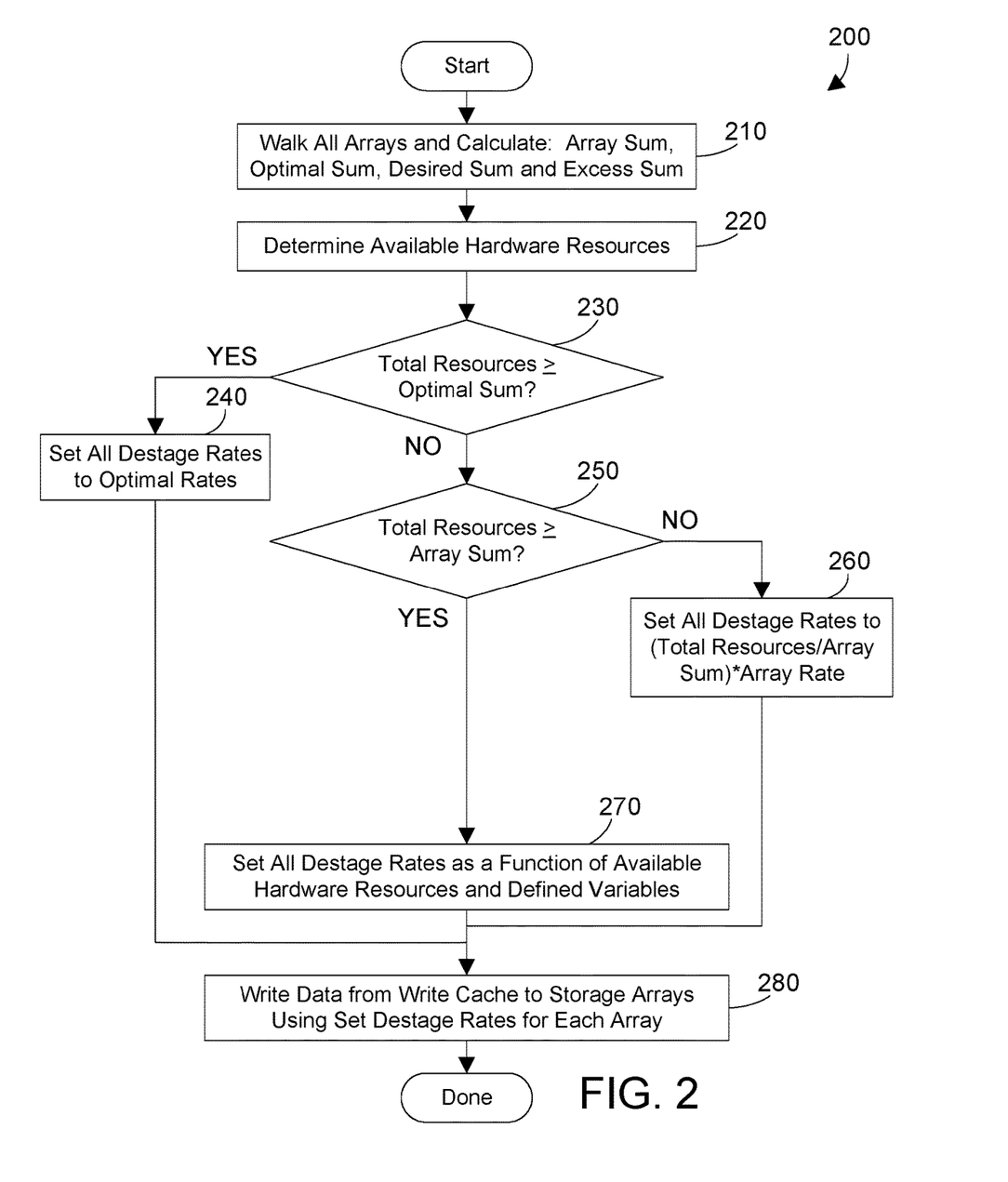
FIG. 2 is a flow diagram of a method for setting destage rates for each of a plurality of storage arrays.

Referring to FIG. 2, a method 200 shows a suitable way to determine and set destage rates for multiple arrays in a storage controller. Walk all arrays and build four sums, namely: Array Sum, Optimal Sum, Desired Sum and Excess Sum (step 210). Components for these sums are shown graphically in FIG. 4 and are discussed in more detail below. The available hardware resources are determined (step 220). The hardware resources needed for destaging may include, for example, hardware control blocks, hardware paths, scratchpad space, hardware buffers, etc. For the specific examples discussed herein, we assume the hardware control blocks are the limiting resource, so the number of hardware control blocks are considered herein when setting destage rates.

When the available resources are greater than or equal to the optimal sum of resources for all arrays (step 230=YES), the destage rates for each array will be set to the array's optimal rate (step 240), because there are sufficient resources to accommodate all of the optimal rates for all arrays. Step 240 represents the best case, when there are sufficient resources to accommodate the optimal destage rates for all arrays. Once the destage rates are set for all arrays to their optimal rates in step 240, data is written from the write cache to the storage arrays using the set destage rates for each array (step 280). Note that data is continually being written from the write cache to the storage arrays, and the rate at which the data is written is driven by the destage rate. The destage rate is altered as circumstances change such as the amount of data in the cache or the locality of data in the cache. When the available resources are less than the optimal sum (step 230=NO), and when the resources are less than the array sum (step 250=NO), each destage rate is set to a value of (Resources/Array Sum)*Array Rate. Step 260 represents the worst case, when there are insufficient resources to accommodate the array rates for each array, so the destage rate is less than the array rate for each array by the same percentage. Once the destage rates are set for all arrays in step 260, data is written from the write cache to the storage arrays using the set destage rates for each array (step 280). When the available resources is greater than or equal to the array sum (step 250=YES), the destage rates for the arrays are set as a function of the available hardware resources and defined variables (step 270). Step 270 represents the middle case, when there are not enough resources to provide the optimal rate for all arrays, but there are enough resources to provide the array rate for all arrays. Once the destage rates are set for all arrays in step 270, data is written from the write cache to the storage arrays using the set destage rates for each array (step 280). Method 200 is then done.

Figure 3:
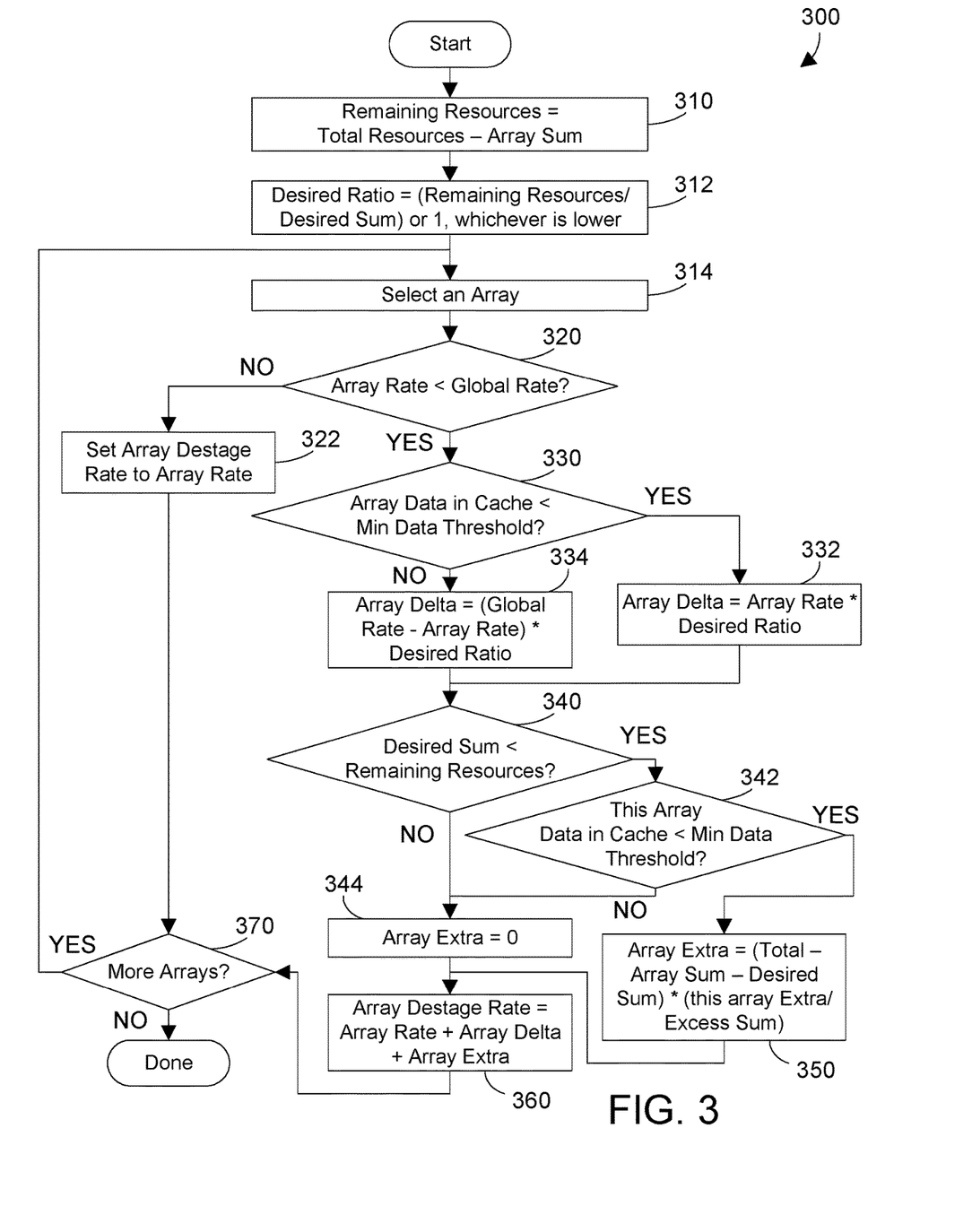
FIG. 3 is a flow diagram of a method that represents one possible implementation of step 270 in FIG. 2.

FIG. 3 shows a method 300 that is one suitable implementation for step 270 in FIG. 2 within the scope of the disclosure and claims herein. A variable referred to herein as Remaining Resources is computed by subtracting the array sum from the total resources (step 310). A variable referred to herein as Desired Ratio is computed by dividing the Remaining Resources by the Desired Sum, then comparing to the number one. The Desired Ratio is the lower of the number one or the Remaining Resources divided by the Desired Sum (step 312). An array is then selected (step 314). When the array rate for the selected array is not less than the Global Rate (step 320=NO), the destage rate for the selected array is set to the Array Rate (step 322). The Global Rate is a rate that addresses the fullness of the entire write cache. When the Array Rate for the selected array is less than the Global Rate (step 320=YES), a determination is made regarding whether the Array data in cache is less than a defined Minimum Data Threshold (step 330). When the Array data in cache is less than the Minimum Data Threshold (step 330=YES), a variable referred to herein as Array Delta is computed by multiplying the Array Rate times the Desired Ratio computed in step 312 (step 332). When the Array data in cache is not less than the Minimum Data Threshold (step 330=NO), the Array Delta variable is computed as the Global Rate minus the Array Rate, with the difference multiplied by the Desired Ratio (step 334). When the Desired Sum is less than the Total Resources less the Array Sum (step 340=YES), and the selected array data in cache is less than the Minimum Data Threshold (step 342=YES), a variable Array Extra is computed by taking the Total Resources less the Array Sum less the Desired sum, and multiplying this result by the Array Extra divided by the Extra Sum (step 350). When the Desired Sum is not less than the Total Resources less the Array Sum (step 340=NO), or when this Array data in cache is not less than the Minimum Data Threshold (step 342=NO), the Array Extra is set to zero (step 344). The Array Destage Rate for the selected array is then computed as the Array Rate plus the Array Delta plus the Array Extra (step 360). When there are more arrays to process (step 370=YES), method 300 returns to step 314 and continues, until there are no more arrays to process (step 370=NO), at which point method 300 is done.

Figure 4:
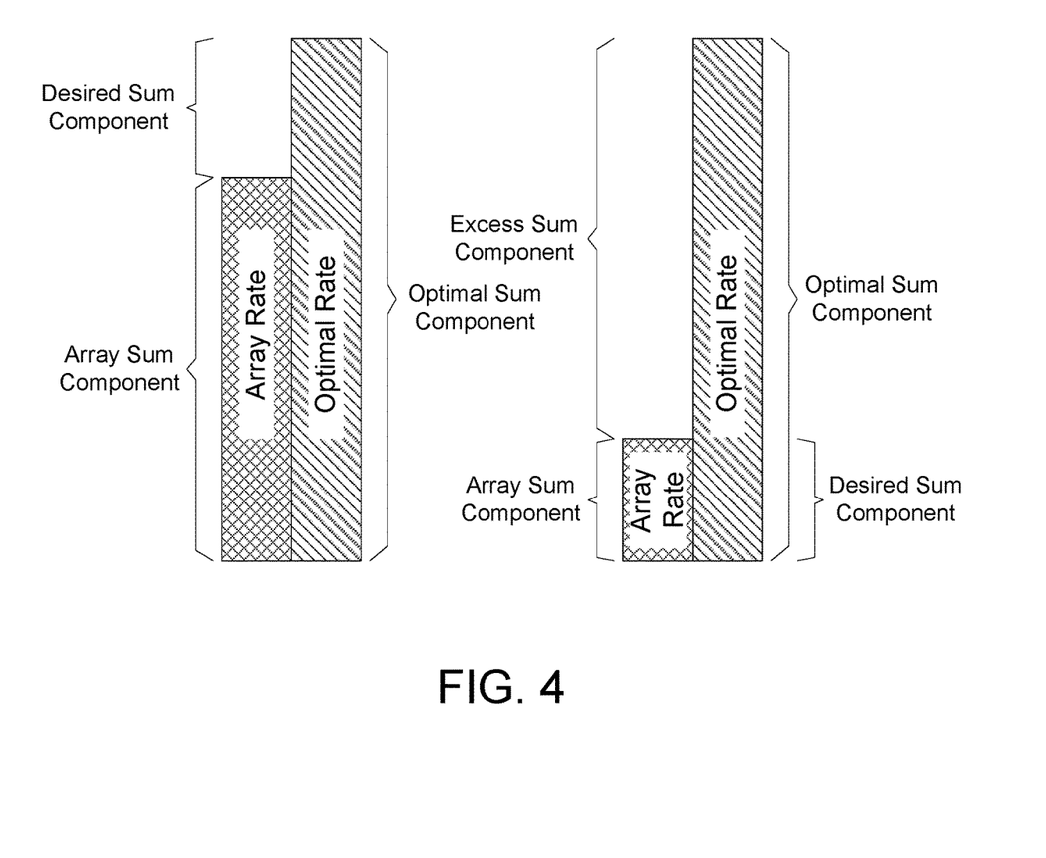
FIG. 4 is a graph showing sums used in the flow diagram in FIG. 3.

The components from each array for the Array Sum, Optimal Sum, Desired Sum and Excess Sum computed in step 210 in FIG. 2 are represented graphically in FIG. 4. The Array Sum is the sum of all Array Rates of all the arrays. The Optimal Sum is the sum of all the Optimal Rates of all the arrays. The definition of the Desired Sum component depends on whether the Array Sum is greater or less than the Minimum Data Threshold shown in FIG. 4. On the left side of FIG. 4, an array which has more data in cache than the Minimum Data Threshold is shown. When the array data in cache is greater than the Minimum Data Threshold, the Desired Sum Component for that array is computed by subtracting the Array Rate from the Optimal Rate. On the right side of FIG. 4, an array that has more data in cache than the Minimum Data Threshold is shown. Often, when an array has data in cache less than the Minimum Data Threshold, the Array Rate will be lower. When the Array data in cache is less than the Minimum Data Threshold, as shown on the right side of FIG. 4, the Desired Sum Component for that array is the same as the Array Sum. The Excess Sum Component is computed by subtracting the Array Sum from the Optimal Sum, as shown on the right side of FIG. 4. Note the Excess Sum Component for an array only exists when the Array data in cache is less than the Minimum Data Threshold, as shown on the right side of FIG. 4.

Figure 5:
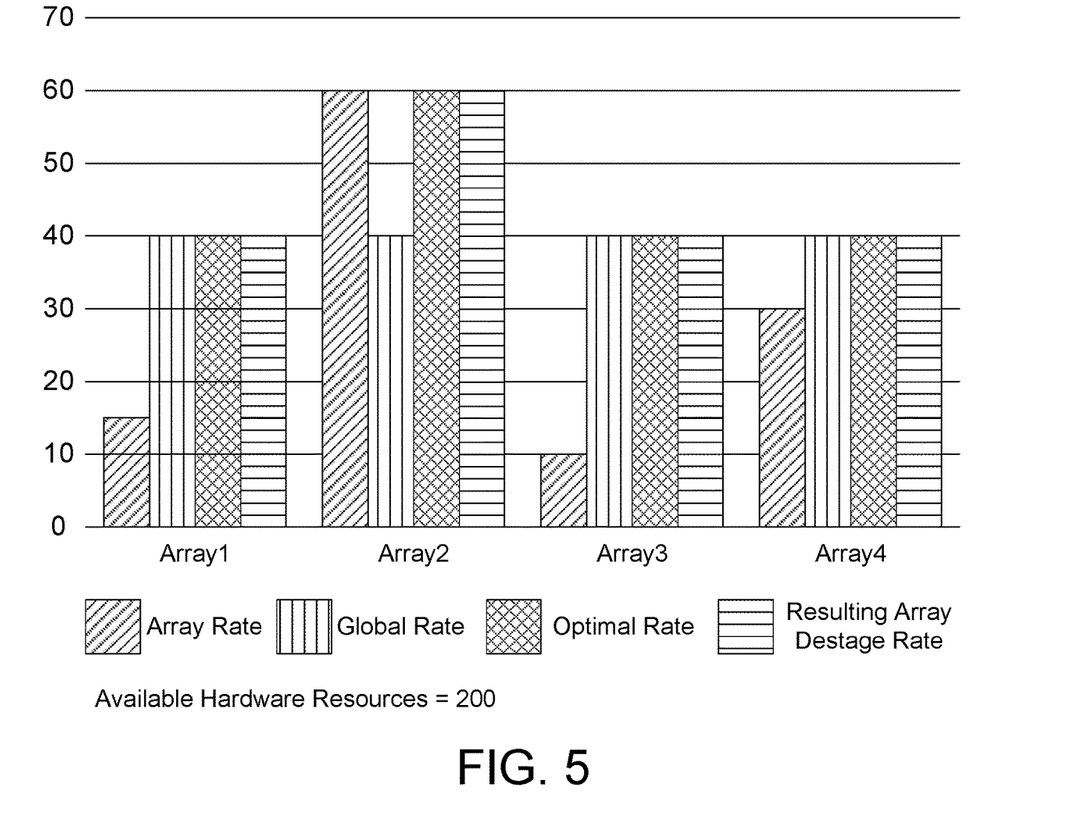
FIG. 5 is a graph of a suitable example for four storage arrays when there are 200 available hardware resources.

Some examples are now given to illustrate how array destage rates are computed under different conditions. Referring to FIG. 5, four arrays are shown with their corresponding Array Rates, Global Rates, Optimal Rates and Resulting Array Destage Rates in bar chart form, which were derived from walking the four arrays and computing these variables, as shown in step 210 in FIG. 2. We assume for the example in FIG. 5 there are 200 available hardware resources, which is determined in step 220 in FIG. 2. The Optimal Sum is computed by adding the Optimal Rates for all arrays. We assume the Optimal Rates are: Array1—40; Array2—60; Array3—40; Array4—40. With these Optimal Rates, the Optimal Sum is 180. Because the available resources are 200 and the Optimal Sum is 180, the available resources are greater than the Optimal Sum (step 230=YES), so the resulting array destage rate for each of the four arrays is set to its corresponding Optimal Rate (step 240). Thus, the resulting array destage rate for Array1 is set to 40; the resulting array destage rate for Array2 is set to 60; the resulting array destage rate for Array3 is set to 40; and the resulting array destage rate for Array4 is set to 40, as shown in the bar graph in FIG. 5. The data in the write cache is then written (or destaged) from the write cache to the four storage arrays using these four destage rates for the four corresponding arrays (step 280). FIG. 5 and step 240 in FIG. 2 illustrate the easy case, when the number of resources equals or exceeds the Optimal Sum. The destage rate for each array can be set to the Optimal Rate for each array because there are sufficient resources to do so.

Figure 6:
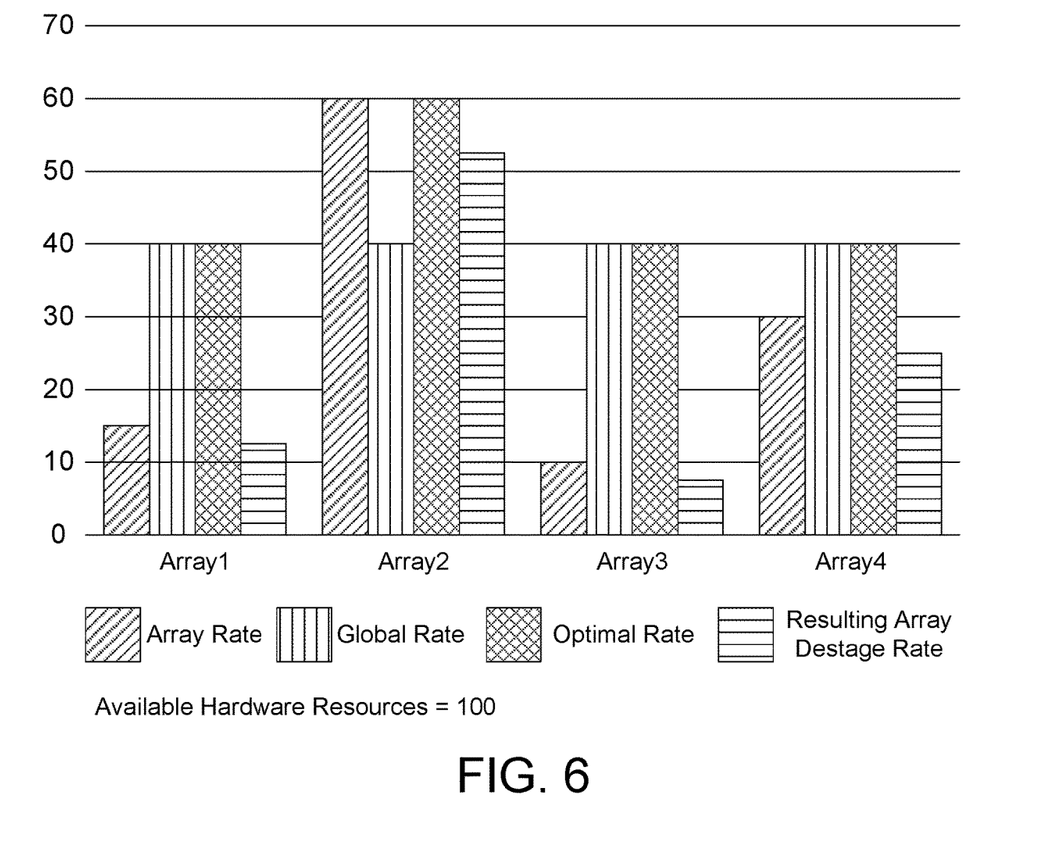
FIG. 6 is a is a graph of a suitable example for four storage arrays when there are 100 available hardware resources.

A second case is shown in FIG. 6, with 100 available hardware resources. Step 210 in FIG. 2 thus produces the values shown in FIG. 6, and the available hardware resources equals 100 in step 220. The Optimal Sum is the sum of the four Optimal rates, which are: 40 for Array1; 60 for Array2; 40 for Array3; and 40 for Array4. The Optimal Sum is thus 180, which exceeds the 100 available hardware resources (step 230=NO). The Array Sum is the sum of the four Array Rates, which are: 15 for Array1; 60 for Array2; 10 for Array3; and 30 for Array4. The Array Sum is thus 115, which is greater than the available resources (step 250=NO). The destage rates for each array are set to the Resources divided by the Array Sum, then multiplied by the Array Rate (step 260). FIG. 6 and step 260 show the worst case, when the number of resources cannot satisfy the Array Sum. In this case, each array is allocated the same percentage of its Array Rate. For the example in FIG. 6, this means the total resources of 100 is divided by the Array Sum of 115, then multiplied by the Array Rate for each array. The ratio of total resources to Array Sum is 100/115, or 0.87, which means each resulting array destage rate is set to approximate 87% of the Array Rate. Thus, the resulting array destage rates are: 13 for Array1; 52 for Array2; 9 for Array3; and 26 for Array4. Because there are insufficient resources to provide the Array Sum, the same percentage of resources multiplied by the Array Rate are allocated to each array in the form of the resulting array destage rate.

Figure 7:
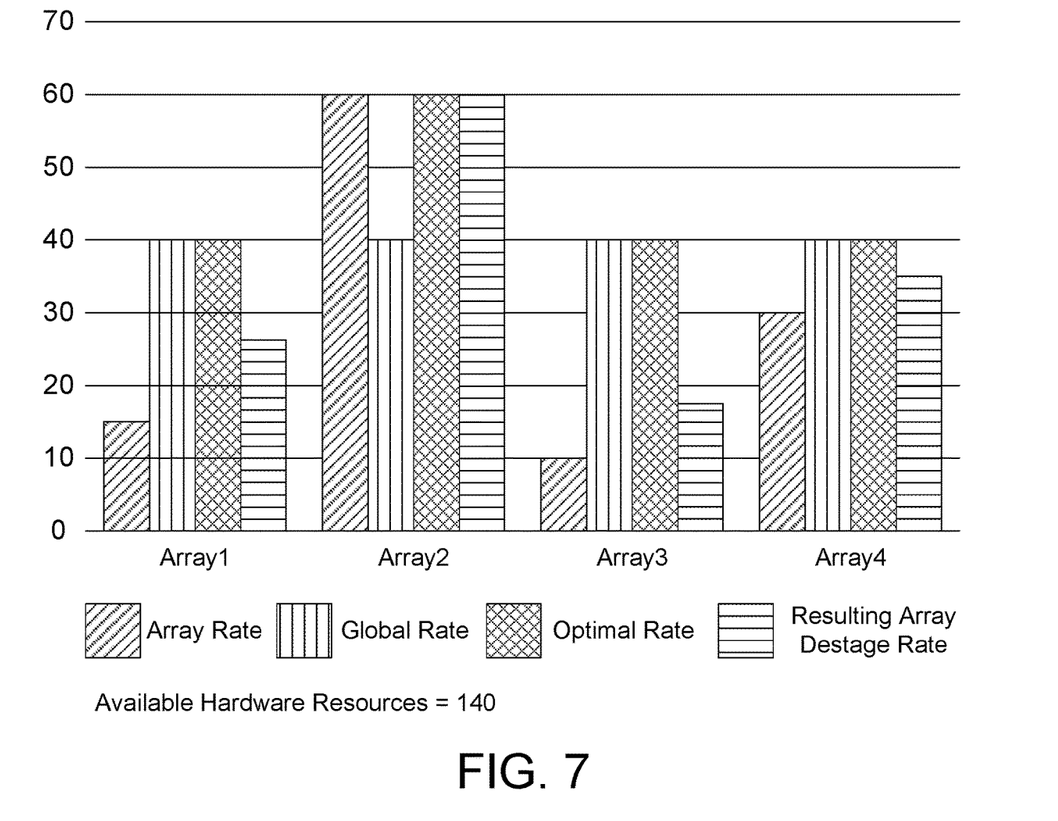
FIG. 7 is a graph of a suitable example for four storage arrays when there are 140 available hardware resources.
Figure 8:
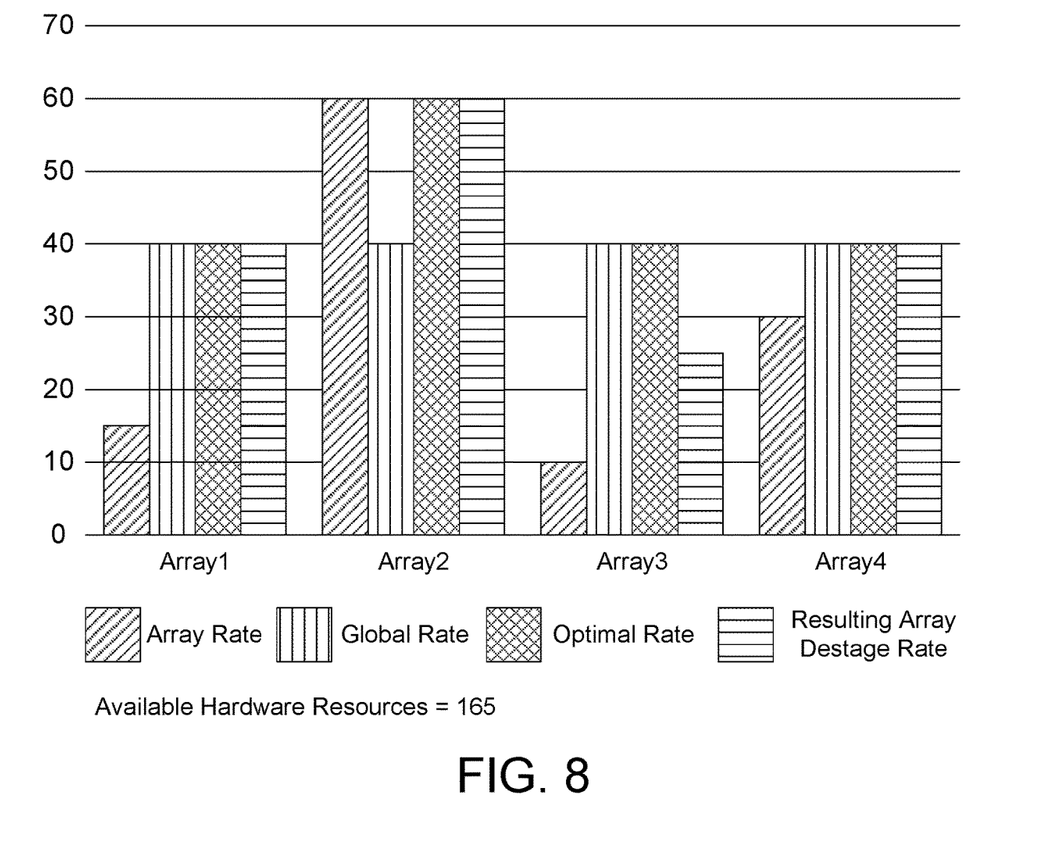
FIG. 8 is a graph of a suitable example for four storage arrays when there are 165 available hardware resources.

FIGS. 7 and 8 show two examples of middle cases that lie between the two extremes in FIGS. 5 and 6. Each of these cases correspond to step 270 in FIG. 2. Method 300 in FIG. 3 is one suitable example of a detailed method for step 270 in FIG. 2. Referring to FIG. 7, the available hardware resources are 140. The array rates are as follows: 15 for Array1; 60 for Array2; 10 for Array3; and 30 for Array4. The Array Sum is thus 115. The Optimal Rate for each array is: 40 for Array1; 60 for Array2; 40 for Array3; and 40 for Array4. The Optimal Sum is thus 180. We assume for this example that Array1, Array2 and Array4 have data in cache above the Minimum Data Threshold, but Array3 has data in cache below the Minimum Data Threshold. The Excess Sum is thus computed as the Optimal Rate for Array3 less the Array Rate for Array3, or 40−10=30. The Desired Sum is the difference between the Optimal Rate and Array Rate for Array1, Array2 and Array4, and is the Array Rate for Array3. Thus, Desired Sum=(40−15)+(60−60)+(40−30)+10=45. The available resources of 140 is less than the Optimal Sum of 180, so step 230=NO in FIG. 2. The available resources of 140 is greater than the Array Sum of 115, so step 250=YES. We then go to step 270, one implementation of which is shown as method 300 in FIG. 3. The Remaining Resources in step 310 is calculated as Available Resources minus the Array Sum, or 140−115, or 25. The Desired Ratio is computed as the Remaining Resources divided by the Desired Sum, or 1, whichever is lower, or 25/45, which is less than 1, so the Desired Ratio is 0.556. Array1 is selected (step 314). The Array Rate of 15 is less than the Global Rate of 40, so step 320=YES. Array1 has data in cache greater than the Minimum Data Threshold so step 330=NO. The product of the Array Delta is calculated in step 334 as Global Rate minus Array Rate multiplied by the desired ratio, or (40−15)*0.556=13.9. The Desired Sum of 45 is greater than the Total Resources of 140 minus the Array Sum of 115 or 25, so step 340=NO. Array Extra is set to 0 in step 344. Finally, in step 360, the Destage Rate for Array1 is set to the Array Rate of 15 plus the Array Delta of 13.9 plus the Array Extra of 0, or 28.9.

There are more arrays to process (step 370=YES), so method 300 loops back to step 314, where Array2 is selected. The Array Rate of 60 for Array2 is not less than the Global Rate of 60, so step 320=NO, and the Array Destage Rate for Array2 is set to the Array Rate of 60 in step 322. There are more arrays to process (step 370=YES), so method 300 loops back to step 314, where Array3 is selected. The Array Rate of 10 for Array3 is less than the Global Rate for Array3, so step 320=YES. The array data in cache is less than the minimum data threshold (step 330=YES), so the Array Delta is computed in step 332 as the Array Rate of 10 times the Desired Ratio of 0.556, or 5.56. The Desired Sum of 45 is not less than the Total Resources of 140 less the Array Sum of 115, or 25, so step 340=NO. The Array Extra is set to zero in step 344. The Array Destage Rate for Array3 is then set in step 360 to the Array Rate of 10 plus the Array Delta of 5.56 plus the Array Extra of 0, or 15.56.

There are more arrays to process (step 370=YES), so method 300 loops back to step 314, where Array4 is selected. The Array Rate of 30 for Array4 is less than the Global Rate, so step 320=YES. The array data in cache for Array4 is not less than the Minimum Data Threshold, so step 330=NO. Array Delta for Array4 is computed in step 334 by taking the Global Rate of 40 and subtracting the Array Rate of 30 multiplied by the Desired Ratio of 0.556, or 5.56. The Desired Sum of 45 is not less than the (Total Resources of 140 less the Array Sum of 115), or 25, so step 340=NO. The Array Extra is set to zero in step 344. The Array Destage Rate for Array4 is then set to the Array Rate 30 plus the Array Delta 5.56 plus the Array Extra 0, or 35.56. There are no more arrays to process (step 370=NO), so method 300 is done. Note the destage rates computed for Array1, Array2, Array3 and Array4 are then used when writing data from the cache to these storage arrays, as shown in step 280 in FIG. 2.

The example above in FIG. 7 results in destage rates that are not whole numbers. The destage rates for Array1, Array2, Array3 and Array4 are 28.9, 60, 15.6 and 35.6, respectively. It is understood that it is not possible to allocate a fractional hardware resource. Thus, these numbers may be adjusted by suitable truncation or rounding to allocate hardware resources in whole units. Thus, the destage rates of 28.9, 60, 15.6 and 35.6 computed above in FIG. 7 could be adjusted to 29, 60, 15 and 36 to provide whole numbers that equal the 140 available resources.

Referring to FIG. 8, the available hardware resources are 165. The array rates are as follows: 15 for Array1; 60 for Array2; 10 for Array3; and 30 for Array4. The Array Sum is thus 115. The Optimal Rate for each array is: 40 for Array1; 60 for Array2; 40 for Array3; and 40 for Array4. The Optimal Sum is thus 180. We assume for this example that Array1, Array2 and Array4 have data in cache above the Minimum Data Threshold, and that Array3 has data in cache below the Minimum Data Threshold. The Excess Sum is thus computed as the Optimal Rate for Array3 less the Array Rate for Array3, or 40−10=30. The Desired Sum is the difference between the Optimal Rate and Array Rate for Array1, Array2 and Array4, and is the Array Rate for Array3. Thus, Desired Sum=(40−15)+(60−60)+(40−30)+10=45. The available resources of 165 is less than the Optimal Sum of 180, so step 230=NO in FIG. 2. The available resources of 165 is greater than the Array Sum of 115, so step 250=YES. We then go to step 270, one implementation of which is shown as method 300 in FIG. 3. The Remaining Resources in step 310 is calculated as Available Resources minus the Array Sum, or 165−115, or 50. The Desired Ratio is computed as the Remaining Resources divided by the Desired Sum, or 1, whichever is lower, or 50/45, which is greater than 1, so the Desired Ratio is 1. Array1 is selected (step 314). The Array Rate of 15 is less than the Global Rate of 40, so step 320=YES. Array1 has data in cache less than the Minimum Data Threshold so step 330=NO. The product of the Array Delta is calculated as Global Rate minus Array Rate multiplied by the desired ratio, or (40−15)*1=25. The Desired Sum of 45 is less than the Total Resources of 165 minus the Array Sum of 115 or 50, so step 340=YES. Array1 has data in cache that is not less than the minimum data threshold (step 342=NO), so Array Extra is set to 0 in step 344. Finally, in step 360, the Destage Rate for Array1 is set to the Array Rate of 15 plus the Array Delta of 25 plus the Array Extra of 0, or 40.

There are more arrays to process (step 370=YES), so method 300 loops back to step 314, where Array2 is selected. The Array Rate of 60 for Array2 is not less than the Global Rate of 60, so step 320=NO, and the Array Destage Rate for Array2 is set to the Array Rate of 60 in step 322. There are more arrays to process (step 370=YES), so method 300 loops back to step 314, where Array3 is selected. The Array Rate of 10 for Array3 is less than the Global Rate for Array3, so step 320=YES. The array data in cache is less than the minimum data threshold (step 330=YES), so the Array Delta is computed in step 332 as the Array Rate of 10 times the Desired Ratio of 1, or 10. The Desired Sum of 45 is less than the Total Resources of 165 less the Array Sum of 115, or 50, so step 340=YES. The array data in cache for Array3 is less than the Minimum Data Threshold, so step 342=YES. The Array Extra is then computed as the Total Resources of 165 less the Array Sum of 115 minus the Desired Sum of 45, or 5, times (this Array Extra of 30 divided by Excess Sum of 30), for a total of 5 for the Array Extra. The Array Destage Rate for Array3 is then set in step 360 to the Array Rate of 10 plus the Array Delta of 10 plus the Array Extra of 5, or 25.

There are more arrays to process (step 370=YES), so method 300 loops back to step 314, where Array4 is selected. The Array Rate of 30 for Array4 is less than the Global Rate, so step 320=YES. The array data in cache for Array4 is not less than the Minimum Data Threshold, so step 330=NO. Array Delta for Array4 is computed in step 334 by taking the Global Rate of 40 and subtracting the Array Rate of 30 multiplied by the Desired Ratio of 1, or 10. The Desired Sum of 45 is less than the (Total Resources of 165 less the Array Sum of 115), or 50, so step 340=YES. The data in cache for Array4 is not less than the Minimum Data Threshold (step 342=NO), so the Array Extra is set to zero in step 344. The Array Destage Rate for Array4 is then set to the Array Rate 30 plus the Array Delta 10 plus the Array Extra 0, or 40. There are no more arrays to process (step 370=NO), so method 300 is done. Note the destage rates computed for Array1, Array2, Array3 and Array4 are then used when writing data from the cache to these storage arrays, as shown in step 280 in FIG. 2.

The disclosure herein refers to "destage rates" in terms of a number of allocated hardware resources. Thus, the destage rates disclosed and claimed herein are not rates in the true sense, such as a number of bytes per second. However, because the rate of destaging data from the write cache for an array is a function of the number of hardware resources allocated to the array, the destage rates are discussed herein as having numerical values corresponding to the number of hardware resources allocated to each array.

The disclosure and claims herein support an apparatus comprising: at least one processor; a write cache coupled to the at least one processor that writes data to a plurality of storage arrays; a plurality of available hardware resources; and a cache destage controller that sets a destage rate for each of the plurality of storage arrays as a function of an array sum that is a sum of array rates for the plurality of storage arrays, an optimal sum that is a sum of optimal rates for the plurality of storage arrays, and the plurality of available hardware resources, wherein when the plurality of available hardware resources exceeds the optimal sum, the cache destage controller sets the destage rate for each of the plurality of storage arrays to the optimal rate for the storage array, wherein when the plurality of available hardware resources is less than the array sum, the cache destage controller sets the destage rate for each of the plurality of storage arrays to the array sum multiplied by an array rate for the storage array divided by the plurality of available hardware resources, wherein the cache destage controller destages data in the write cache to each of the plurality of storage arrays using the set destage rates for the plurality of storage arrays.

The disclosure and claims herein further support an apparatus comprising: at least one processor; a write cache coupled to the at least one processor that writes data to a plurality of storage arrays; a plurality of available hardware control blocks; and a cache destage controller that sets a destage rate for each of the plurality of storage arrays as a function of an array sum that is a sum of array rates for the plurality of storage arrays, an optimal sum that is a sum of optimal rates for the plurality of storage arrays, and the plurality of hardware resources, wherein when the plurality of available hardware resources exceeds the optimal sum, the cache destage controller sets the destage rate for each of the plurality of storage arrays to the optimal rate for the storage array, wherein when the plurality of available hardware resources is less than the array sum, the cache destage controller sets the destage rate for each of the plurality of storage arrays to the array sum multiplied by an array rate for the storage array divided by the plurality of available hardware resources, wherein when the plurality of hardware resources does not exceed the optimal sum and the plurality of hardware resources is not less than the array sum, the cache destage controller computes remaining resources as the plurality of hardware resources less the array sum and computes desired ratio as the remaining resources divided by the desired sum, or 1, whichever is lower, wherein the cache destage controller selects one of the plurality of storage arrays, and when the array rate for the selected storage array is not less than a global rate, the destage rate for the selected storage array is set to the array rate for the selected storage array, wherein when the array rate for the selected storage array is less than the global rate, and the data in cache for the selected storage array is less than a minimum data threshold, computing an array delta as the array rate of the selected storage array times the desired ratio, and when the data in cache for the selected storage array is not less than the minimum data threshold, computing the array delta as the global rate less the array rate times the desired ratio, wherein when the desired sum is less than the plurality of available hardware resources less the array sum, and the data in cache for the selected array is below the minimum data threshold, computing an array extra for the selected array as the plurality of hardware resources less the array sum less the desired sum, multiplied by the array extra divided by the extra sum, wherein when the desired sum is not less than the plurality of available hardware resources less the array sum, setting the array extra to zero, and setting the array destage rate for the selected array to be the array rate plus the array delta plus the array extra, wherein the cache destage controller destages data in the write cache to each of the plurality of storage arrays using the set destage rates for the plurality of storage arrays.

The disclosure and claims herein additionally support a method for destaging data from a write cache in a storage controller to a plurality of storage arrays, the method comprising: providing a plurality of available hardware resources; and setting a destage rate for each of the plurality of storage arrays as a function of an array sum that is a sum of array rates for the plurality of storage arrays, an optimal sum that is a sum of optimal rates for the plurality of storage arrays, and the plurality of hardware resources, wherein when the plurality of available hardware resources exceeds the optimal sum, setting the destage rate for each of the plurality of storage arrays to the optimal rate for the storage array, wherein when the plurality of available hardware resources is less than the array sum, setting the destage rate for each of the plurality of storage arrays to the array sum multiplied by an array rate for the storage array divided by the plurality of available hardware resources; and destaging data in the write cache to each of the plurality of storage arrays using the set destage rates for the plurality of storage arrays.

A storage controller includes a cache destage controller that determines write cache destage rates for each of a plurality of storage arrays as a function of available system resources. When the available system resources are sufficient to satisfy the optimal destage rates for all arrays, the destage rate for each array is set to its optimal rate. When the available system resources are insufficient to satisfy the array rates of all of the arrays, each array is allocated destage rate that is a percentage of the array rates based on the available resources. When the available system resources are insufficient to satisfy the optimal destage rates for all arrays, but sufficient to satisfy the array rates of some of the arrays, a destage rate is determined for each array based on mathematical relationships between sums of the array rates, global rates, optimal rates, and sums of these across arrays. If an array has very little data in cache, the array is said to be below a minimum data threshold. The minimum data threshold is used to otherwise reduce an increase in a destage rate to an array that does not meet the minimum data threshold, thereby reducing the system resources used by that array and making these system resources available to other arrays.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a write cache coupled to the at least one processor that writes data to a plurality of storage arrays;
   a plurality of available hardware resources; and
   a cache destage controller that sets a destage rate for each of the plurality of storage arrays as a function of an array sum that is a sum of array rates that represent current destage rates for the plurality of storage arrays, an optimal sum that is a sum of optimal rates for the plurality of storage arrays, and the plurality of available hardware resources, wherein when the plurality of available hardware resources exceeds the optimal sum, the cache destage controller sets the destage rate for each of the plurality of storage arrays to the optimal rate for the storage array, wherein when the plurality of available hardware resources is less than the array sum, the cache destage controller sets the destage rate for each of the plurality of storage arrays to the plurality of available hardware resources divided by the array sum and multiplied by an array rate for the storage array, wherein the cache destage controller destages data in the write cache to each of the plurality of storage arrays using the set destage rates for the plurality of storage arrays, wherein when the plurality of hardware resources does not exceed the optimal sum and the plurality of hardware resources is not less than the array sum, the cache destage controller computes remaining resources as the plurality of hardware resources minus the array sum and computes desired ratio as the remaining resources divided by a desired sum, or 1, whichever is lower, wherein the cache destage controller selects one of the plurality of storage arrays, and when the array rate for the selected storage array is not less than a global rate that addresses fullness of the write cache, the destage rate for the selected storage array is set to the array rate for the selected storage array.

2. The apparatus of claim 1 wherein the plurality of hardware resources comprise hardware control blocks.

3. The apparatus of claim 1 wherein when the array rate for the selected storage array is less than the global rate, and the data in cache for the selected storage array is less than a minimum data threshold, computing an array delta as the array rate of the selected storage array times the desired ratio, and when the data in cache for the selected storage array is not less than the minimum data threshold, computing the array delta as the global rate minus the array rate times the desired ratio.

4. A method for destaging data from a write cache in a storage controller to a plurality of storage arrays, the method comprising:

provi­ding a plurality of available hardware resources; and setting a destage rate for each of the plurality of storage arrays as a function of an array sum that is a sum of array rates that represent current destage rates for the plurality of storage arrays, an optimal sum that is a sum of optimal rates for the plurality of storage arrays, and the plurality of hardware resources, wherein when the plurality of available hardware resources exceeds the optimal sum, setting the destage rate for each of the plurality of storage arrays to the optimal rate for the storage array, wherein when the plurality of available hardware resources is less than the array sum, setting the destage rate for each of the plurality of storage arrays to the plurality of available hardware resources divided by the array sum and multiplied by an array rate for the storage array, wherein when the plurality of hardware resources does not exceed the optimal sum and the plurality of hardware resources is not less than the array sum, computing remaining resources as the plurality of hardware resources minus the array sum and computing desired ratio as the remaining resources divided by a desired sum, or 1, whichever is lower, further comprising selecting one of the plurality of storage arrays, and when the array rate for the selected storage array is not less than a global rate that addresses fullness of the write cache, the destage rate for the selected storage array is set to the array rate for the selected storage array; and destaging data in the write cache to each of the plurality of storage arrays using the set destage rates for the plurality of storage arrays.

5. The method of claim 4 wherein the plurality of hardware resources comprise hardware control blocks.

6. The method of claim 4 wherein when the array rate for the selected storage array is less than the global rate, and the data in cache for the selected storage array is less than a minimum data threshold, computing an array delta as the array rate of the selected storage array times the desired ratio, and when the data in cache for the selected storage array is not less than the minimum data threshold, computing the array delta as the global rate minus the array rate times the desired ratio.

* * * * *